Patented Feb. 14, 1939

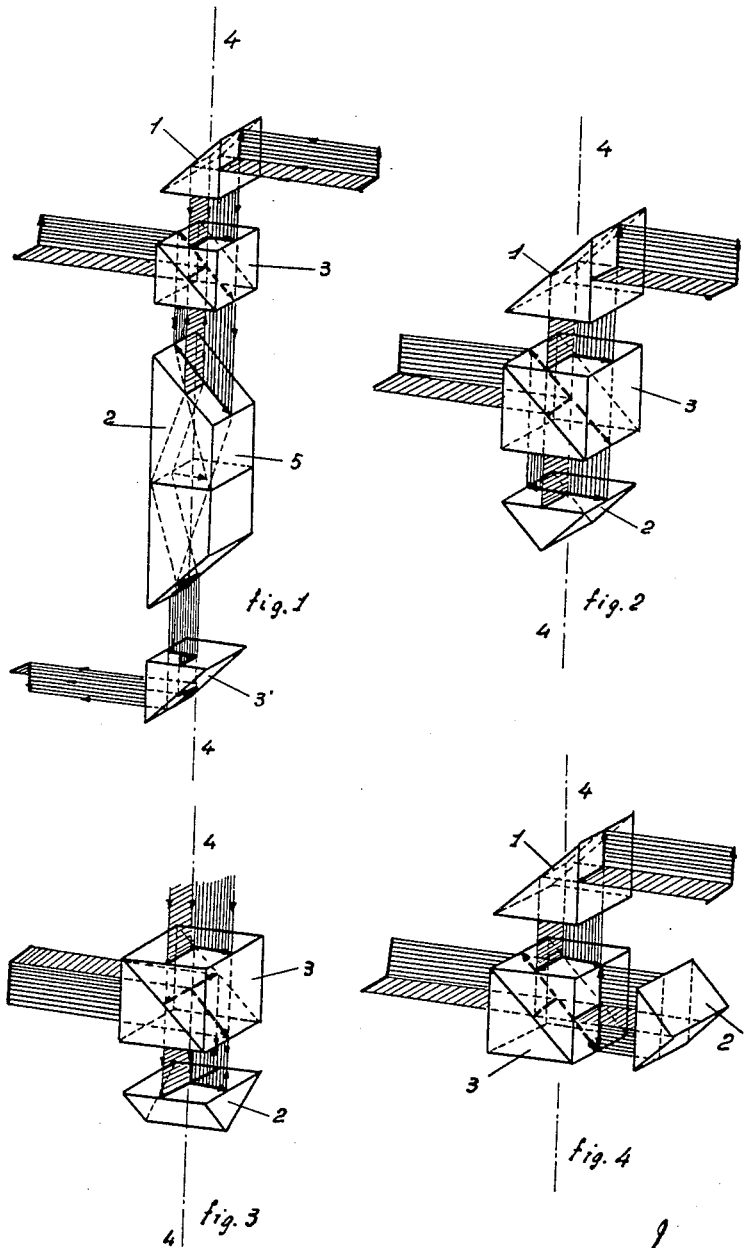

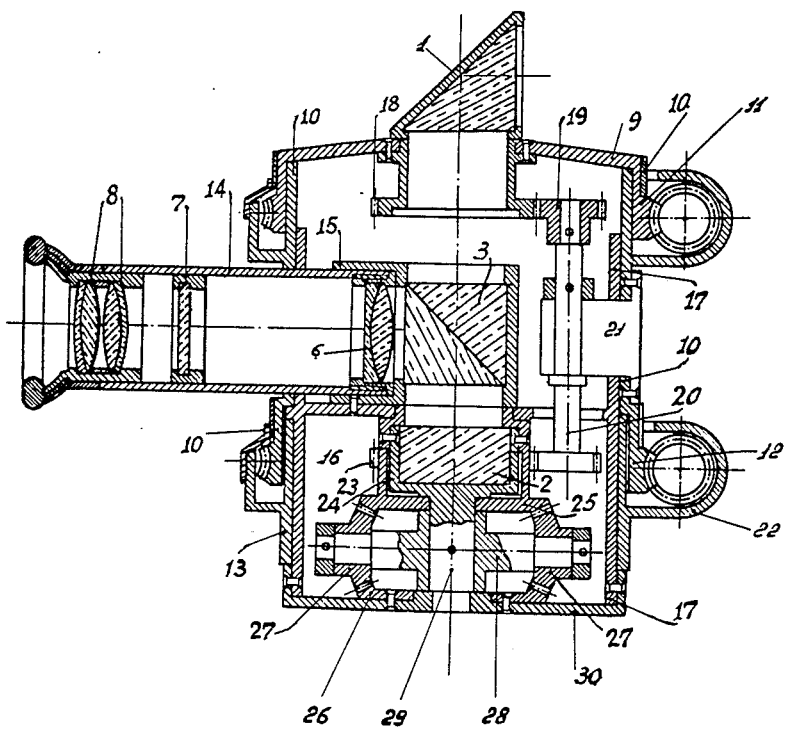

2,147,615

UNITED STATES PATENT OFFICE 2,147,615

OPTICAL DEVICE FOR PANORAMIC TELESCOPES AND THE LIKE, EQUIVALENT TO THE AMICI ROTATING PRISM

Augusto Baroni, Rome, Italy

Application June 18, 1937, Serial No. 148,856
In Italy June 18, 1936

2 Claims. (Cl. 88—72)

It is known that, when looking through an isosceles right angled prism, in a direction parallel to the face of the hypothenuse, the image viewed, is seen reversed laterally or from the bottom to the top, according to whether said face is horizontal or vertical; and that if the prism is made to rotate about an axis parallel to its principal section and to the hypothenuse face, looking in the direction of this axis, to the rotation of the prism there is a corresponding rotation, with double the angular velocity, of the image of each objective plane normal to the axis of rotation. The rectangular prism thus employed has been named Amici reversing prism. A characteristic application of this prism is in the known panoramic telescope, in which its rotation in the constant ratio of 1:2 with respect to the rotation of the objective prism, prevents any rotation of the image when varying the direction of observation.

The present invention has for its object to produce a new optical device adapted to obtain the same effects of the Amici prism, which may be substituted for this latter in its various applications. The principal element of the new device is formed by a double mirror at right angles, or by a dihedral rectangle with polished faces, which in actual practice will preferably be an isosceles rectangular prism with the cathetus faces silvered, so employed that its hypothenuse face is at the same time the normal face of incidence and of emergence of the light rays. Said element is thus a double reflecting backviewing prism, in which the sequence of the two reflections has no importance as regards the position of the image, and consequently operates as a roofed prism. Apart from parallel uncoverings due to the refraction in the glass, the edge of the dihedron is the axis of symmetry between the object (real or its optical image) and the corresponding virtual image; consequently the rotation of such mirror prism, about an axis which is normal to the edge, and which is contained in the bisector plane of the reflecting faces, produces a rotation having a double angular velocity, of the image of an objective plane normal to said axis, thus reproducing the characteristic effect of a rotating Amici reversing prism. However, owing to the superposition of the emerging rays with the incidence rays, in order to effect practically the observation, it is necessary to use a translucent and semi-reflecting mirror, which may also be formed by a cube made up with two equal isosceles right angled prisms glued together on their hypothenuse faces, one of which must be previously silvered.

In the accompanying drawings, illustrating the present invention;

Fig. 1 is a perspective view adapted to explain the fundamental principle of the invention and its functional equivalence with respect to the Amici prism, which latter has been heretofore used exclusively in panoramic telescopes, Figures 2 and 3 show in perspective the device with the roof mirror-prism in positions orientated by 90° with respect to each other, Fig. 4 shows another possible setting of the device, while Fig. 5 shows by way of example and diagrammatically an application of the device to the construction of a panoramic telescope.

Considering in Fig. 1 the system formed by the prisms 1, 2 and 3', leaving aside for the moment the presence of the translucent and semi-reflecting mirror shown by the cube 3, the characteristic arrangement of prisms of a panoramic telescope may be readily seen, in which 1 is the objective prism, which, when rotating about the axis 4—4 explores the horizon, 2 is the Amici prism mechanically connected so as to rotate in the same direction with an angular velocity, which is half the velocity of prism 1, for the purpose of compensating the rotations of the images, and 3' is the fixed ocular prism. This latter should, however, be a roofed prism, or in any case a double reflecting prism, in order that the images should be congruent, while in the figure it is shown single, and consequently the images are specularly reversed; however the necessary reflection may be introduced. Now, if the Amici prism 2 is cut at half its height by an horizontal plane 5, the lower half of this prism as well as the prism 3' is removed, the face obtained in the sectional plane is mirror polished, and between the objective prism 1 and the half Amici prism 2, and the translucent semi-reflecting cube 3 is introduced, this latter assumes the function of a fixed ocular prism, as its semi-reflecting face, inclined by 45° is symmetrical to the reflecting face of prism 3' which has been withdrawn, with respect to the horizontal plane 5. The incidence rays in the prism 2, striking the specular plane 5, will be reflected upwards and will assume a course symmetrical to that of the light rays which before followed a course below said plane. The observation through the system thus transformed, having added thereto the reflection which before was wanting, will furnish congruent images; and the upper half of the Amici prism 2 will maintain unaltered the characteristic compensating function of the whole rotatable prism in the original system. However, the other half of prism 2 is simply a portion of an isosceles rectangular prism, acting as a double mirror, the two reflecting planes of which are the cathetus faces, while the hypothenuse face serves at the same time for the incidence and for the emergence of the light rays. Consequently, by taking advantage of the known properties of the double mirrors, it will be possible, without influencing in any way the formation of the images, to confer to this prism the best position for its optical efficiency, by causing it to rotate through 45° about an horizontal axis contained on its bisecting plane, passing through the axis, so that its hypothenuse face may become normal to the principal direction of incidence and of emergence. Thus the known system of prisms of a panoramic telescope, will be transformed into the equivalent system forming the object of the present invention, as shown in Fig. 2.

By comparing the Amici prism system plus the ocular prism of the panoramic telescopes now used, with its equivalent according to this invention, formed by the roof shaped mirror prism plus the translucent and semi-reflecting cube, it is easy to understand that in both devices the greatest light losses are due to two successive light rays, reflections on faces inclined at 45°, and therefore they are nearly equivalent also from the point of view of light efficiency, consequently the two systems may both be preferred, one or the other according to the specific conditions and exigencies of practical applications. In view of the above, the device according to this invention may prove advantageous both because other conditions remaining equal, it allows a greater opening of the objective (in fact the length of the Amici prism is about four times the opening, while in the device according to this invention, the sizes of all prisms, including the rotatable prism, increase by amounts which are approximately equal to the increase of the opening) because it operates in good optical conditions also with converging rays, and lastly due to the compact disposition of its parts. While the rectifying condition of the rotatable Amici prism in the known panoramic telescope and in other similar applications is such that its reflecting face must be parallel to the mechanical axis of rotation, in the present device according to this invention, the rotating mirror prism is subjected to the more favourable condition that its edge (axis of the angular mirror) is normal to the mechanical axis of rotation.

In Fig. 3 the same diagrammatic scheme as that shown in Fig. 2 is given, leaving out prism 1 (which is not an essential feature of the device) but showing the double reflecting mirror prism 2 turned through 90° about the axis 4—4. Be it supposed that the prism 1 has remained in its first position, the image of an object would appear upturned. Be it supposed on the other hand that the object is placed on the opposite side with respect to the axis 4—4, that is to say before prism 1 has rotated through 180° with respect to this axis, the image of the object would reappear straight.

Fig. 4 shows a disposition equivalent to that shown in Fig. 2, from which latter may be supposed to be derived by rotating at the same time the cube 3 through 180°, and the double mirror prism 2 through 90° about an horizontal axis normal to the axis 4—4, lying on the semispecular surface of the cube, leaving unaltered the fixed direction of the emerging rays, as well as the direction and the velocity of rotation of the prism 2 connected mechanically to prism 1, for its compensating duty of the rotations of the image.

A device will now be described by way of example as applied to the construction of a panoramic telescope (Fig. 5). The optical device is similar to that previously described and shown in Fig. 2, except that the rotating prism is orientated as shown in Fig. 3, and is completed by the addition of an astronomical telescope 14 regulated for viewing distant objects, opposite to the face of emergence of the cube 3 and integral with it; 6 and 7 are respectively the objective, the plate of the sighting mark and the ocular. Obviously, the structure formed by the prisms 1 and 2, and the lower prism of the two portions forming the cube 3, is equivalent, in the disposition shown in the figure, to a reversing Porro vehicle of the second type, with the difference that in the space intervening between the reflecting face of the cube 3 and the two reflecting faces of prism 2, the incidence and emerging rays are commingled, and that each of said faces operates at the same time both for the first and for the second reflection of the incident rays. As the system of such reflections would furnish by itself images inverted by 180° by its combination with an astronomical telescope which also reverses by 180°; the whole optical system under the conditions shown in the figure, provides straight images, and it is known that the images will remain as such whichever is the orientation of prism 1, also when to its rotation, for assuming this orientation, there is added a rotation in the same direction and of half the angular value of prism 2. However, since, as explained below, it is of advantage that also the astronomical telescope 14, with the cube 3, may rotate through a certain angle about the axis 4—4, for the purpose of obtaining this without the rotation of the image, it is required that in such case the prism 2 may be subjected to a rotation through half the angle in the same direction. The objective prism 1 which in Fig. 5 is for simplicity shown fixed "in situ", but which may be supposed to have a limited movement of rotation about an horizontal axis, as in the known panoramic telescopes, is mounted on the piece 9, shaped as an overturned cylindrical cup, which is passed through the tube 10, in relation to which it can revolve about the axis 4—4 by means of a clutch mechanism 11 comprising an endless screw and an helicoidal toothed crown. The tube 10 is in its turn rotatable, by means of a second mechanism 12 similar to the one first mentioned, in relation to the bearing 13, the outer collar of which serves for fixing the apparatus on to any desired support. The astronomic telescope 14 is fixed on to the same mounting 15 of the translucent and semi-reflecting cube 3, which mounting is integral with the diaphragm 16 integral with the tube 17, which latter is therefore also integral with the telescope tube 14. In order to allow the passage of this tube and its limited rotation about the axis 4—4, an horizontal slot is provided in the tube 10. The piece 9 carries, fixed on its axis, the cylindrical toothed wheel 18 meshing with the pinion 19 keyed on the small vertical shaft 20, rotatable in a bearing 21, fixed on the tube

10. In order that this bearing may not prevent the limited rotation of the tube 17, this latter is also provided with a suitable horizontal slot.

At the lower end of the small shaft 20, there is keyed a pinion 22 which is identical to the pinion 19, and which meshes with the toothed cylindrical wheel 23, similar to the wheel 18, mounted loosely on the mounting 24 of the prism 2 which mounting is externally cylindrical (which can be machined normally to the hypothenuse face, and taking away the useless portions adjacent to the four corners of said face). The wheel 23 is integral with the co-axial conical gearing 25, forming one of the planets of a differential gear of which 26, is the other planet, and 27—27' are two diametrically opposed planets mounted loosely on a common horizontal shaft 28, which crosses with the vertical pivot 29 integral with the mounting 24 of the prism 2. The shaft 28 and the pivot 29 are connected together so as to be adapted to rotate together about the axis 4—4. The planetary 26 is fixed by means of the sleeve 30 to the tube 17, and is consequently integral with the telescope tube 14. Obviously, to each rotation of prism 1 about the axis 4—4, there is a corresponding equal and similar rotation of planet wheel 25, and therefore, if the planet wheel 26 (and consequently the ocular) is fixed, prism 2 will rotate in the same direction and half the angle. The same occurs if it be supposed that the planet 25 (and consequently the objective prism 1) is fixed, the tube 14 of the telescope is rotated. The two mechanisms 11 and 12 for the azimuth rotations, provided with graduated drums, form a double system of azimutral measure, adapted for use in artillery applications (parallelism and direction). The limited freedom of rotation of the ocular serves to prevent the observation from being interfered with by the head of the observer.

The example above described proves that the device according to this invention is adapted to substitute the Amici prism in the better known and characteristic case of its use, and quite apart from this, the device may prove also advantageous for other applications which have up to now been reserved to the Amici reversing prism.

I claim:

1. An optical system including an entrance reflector, a transparent reflector formed of two equal isosceles rectangular prisms disposed with their hypothenuse faces in abutting relationship, one of said faces being half-silvered, an isosceles rectangular prism having silvered cathedo faces, said entrance reflector and said transparent reflector and isosceles rectangular prism being disposed in a common axis with the transparent reflector located between the entrance reflector and said isosceles rectangular prism, said entrance reflector and said isosceles rectangular prism being mounted by means for rotation relative to said transparent reflector, means for rotating the said isosceles rectangular prism through half the angle in the same direction that said entrance reflector and said transparent reflector have been rotated with respect to each other, the hypothenuse face of said isosceles rectangular prism and the adjacent face of said transparent reflector being disposed in planes parallel to each other and at right angles to said common axis.

2. An optical system as set forth in claim 1 in which the entrance reflector and the isosceles rectangular prism are rotatable about an axis at right angles to the common axis of said entrance reflector and said transparent reflector and said isosceles rectangular prism and which intersects said common axis in the hypothenuse faces of the prisms of the transparent reflector.

AUGUSTO BARONI.